Figure 1:
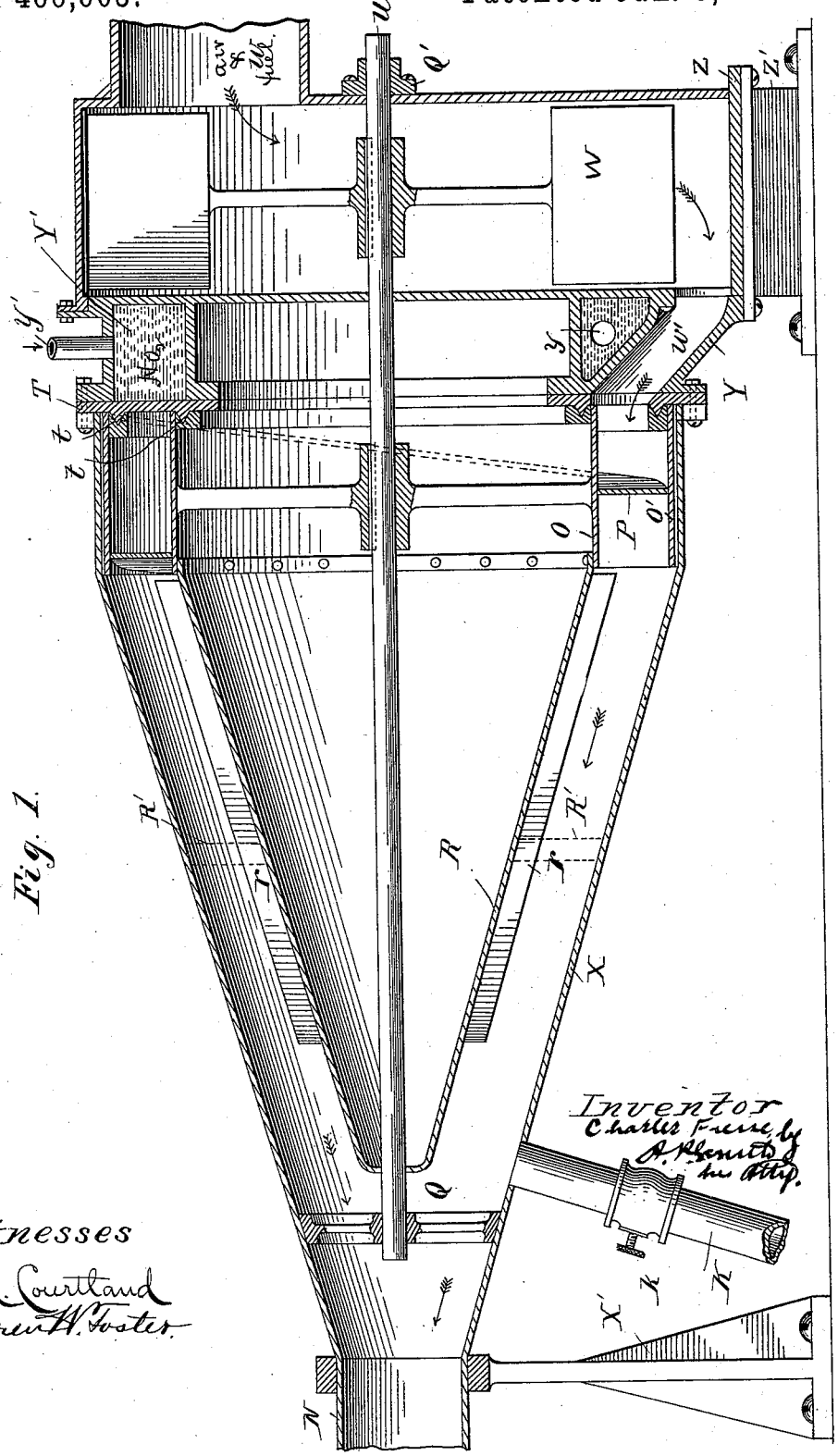

(No Model.) 2 Sheets—Sheet 1.

C. FIESSE.
GAS PRODUCER.

No. 466,603. Patented Jan. 5, 1892.

Witnesses
W. H. Courtland
Warren H. Foster

Inventor
Charles Fiesse by
A. H. Smith
his Atty.

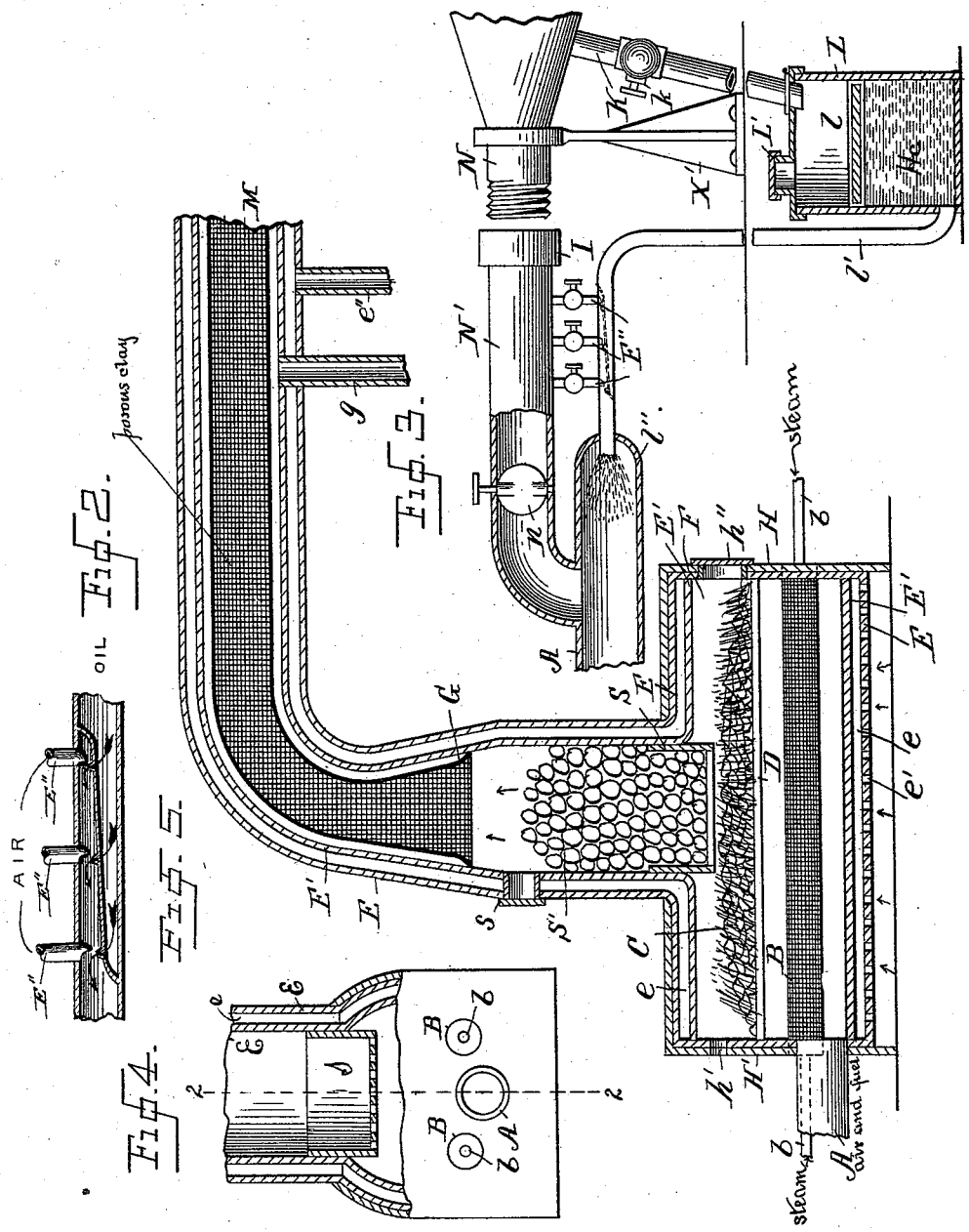

UNITED STATES PATENT OFFICE.

CHARLES FIESSE, OF NEW YORK, N. Y.

GAS-PRODUCER.

SPECIFICATION forming part of Letters Patent No. 466,603, dated January 5, 1892.

Application filed November 18, 1890. Serial No. 371,816. (No model.)

*To all whom it may concern:*

Be it known that I, CHARLES FIESSE, a citizen of the French Republic, residing at New York, in the county of New York and State of New York, have invented certain new and useful Improvements in Gas-Producers; and I do hereby declare the following to be a full, clear, and exact description of the invention, such as will enable others skilled in the art to which it appertains to make and use the same.

My invention consists in an improved apparatus for manufacturing fuel-gas and in certain specially-designed machinery in connection therewith.

In the drawings, Figure 1 shows a longitudinal section of an improved form of blower and compressor for use in connection with my invention. Fig. 2 shows a longitudinal section of the gas-producing apparatus proper. Fig. 3 is a detail view of a special attachment to the blower. Fig. 4 is an end view and partial section of the gas-producer. Fig. 5 is a detail view.

The object of my invention is to produce a fuel-gas composed, mainly, of hydrogen and carbonic oxide and also to separate the former from the latter as far as possible. The main fuel-supply may be either atomized oil or pulverized coal-dust alone or mixed with a suitable percentage of pulverized charcoal or coke which has absorbed or is loaded with any suitable hydrocarbon, such as Lima oil, fuel-oil, naphtha, &c., sprinkled or poured over the charcoal or coke before or after pulverization. To the extent of the contemplated use of the former fuel, this invention may be regarded as an improvement on that described in Patent No. 433,336, granted to me July 29, 1890.

The apparatus herein described consists of a furnace F, of any suitable materials and desired shape, preferably in the form of the cylinder E', incased by a metallic shell, surrounded itself by a second metallic shell E, leaving a suitable space $e$ between, forming an air chamber or jacket to warm, by the radiation of the fuel-chamber, the air entering through suitable openings $e'$. In the bottom of the furnace is the grate D, bearing a mass of balls of compressed coal-dust, charcoal, or coke C. Beneath this grate a supply of finely-pulverized fuel is brought in through the pipe A by a stream of air from any suitable blower, though the form shown in Fig. 1 is preferred. Across this space below the grate extend two pipes B, formed of some proper porous material. Steam is supplied to these pipes B by suitable feed-pipes $b$. Pieces H and H' cover the ends of the cylinders E and E' and serve to support the same.

$h'$ is an opening containing isinglass, through which the condition of the bed of fuel C may be inspected, and $h''$ is an opening through which said fuel may be replenished. A suitable door (not shown) is also provided in the piece H' for taking away the ashes. Over the furnace is a species of vessel S, having a perforated bottom containing a collection of broken stone or clay and oxide of iron or other suitable substances S', which may serve as a strainer and a purifier for the gases passing through. Through the opening $s$ this supply may be renewed, for cleaning. The grated bottom of this vessel is shown in Fig. 4 in section.

The sheet-iron shell of the cylinder E' is continued up around the pot S and onward in the shape of a pipe E', as shown. Outer cylinder E is similarly continued in the shape of an outer pipe E. The space $e$ between these shells and pipes is an air-space, into which air enters at the bottom, as indicated by the arrows, Fig. 2. Inside the pipe E' is placed a third pipe of porous material M, leaving space G between the pipe E' and that M. Gases collecting in this space, as well as the heated air in the space $e$, can be drawn off by means of suitable exhausters and blowers (not shown) fixed to the pipe $e''$ and to pipe $g$.

The blower and compressor illustrated in Fig. 1 consists of the castings Y and Z and the cone X, bolted together and supported on standards X' and Z' and containing the revolving fans W and helical thread P. The shaft $u$ revolves in bearings Q and Q', and the fans W are keyed thereon. It also carries the two cylinders O and O', provided with small friction-rollers (not shown) on their edge, and the helical thread P, fixed between said cylinders. The inner cone R, carrying the small blades $r$, may be fastened to the cylinder O and revolve therewith, or it may be separated from it and rigidly connected to the casing X by studs R', as indicated in dotted lines, Fig. 1.

The casing Y has its front closed for the greater portion of its circumference by the face-plate T, thus forming a water-space Y', into which water is introduced by a pipe $y'$ for cooling the face-plate T, and from which it passes out by the pipe $y$. The face-plate T is preferably made of some polished material that forms a good bearing, such as brass or Babbitt metal. Two rings $t\ t$, fixed on the rear edge of the cylinders O and O' and provided with grooves V-shaped, as shown, filled with a suitable mixture—such as tallow and plumbago — for lubricating purposes, run smoothly on the corresponding V-shaped bearings on the face-plate T, and so a minimum of friction is secured. The air or a minimum of air and pulverized fuel is admitted through the opening $w$. The passage-way $w'$ extends from the fan-casing through the casing Y and through a suitable opening on the face-plate T between the cylinders O and O', bearing the helical thread P, and at last between the cones X and R, where the air is compressed. From thence the pipe N leads the compressed air into pipe A, which feeds into the furnace, as before described. The pulverized fuel is mixed with the air supplied to the blower by any suitable feeder.

A modification of the apparatus by which oil may be atomized and fed into the furnace is shown in Fig. 3. The tank L has an opening L', through which it can partly be filled with oil, as shown. The float I acts as a piston to force the oil out through pipe I' when the pressure of compressed air transmitted through pipe K and controlled by valve $k$ is brought upon the upper side of said float after the valve $n$ has been closed. The valve $n$ in the pipe-extension N' being closed, the air passes through the pipes E'', atomizing the oil forced through the pipe I', which is provided with an atomizer of any convenient form within the pipe I', forcing it into the furnace under the grate D with a minimum of compressed air in the form of oil-vapor through the flaring extension I'' of the pipe I'.

The operation of my invention is as follows: The bed of coal-dust balls, charcoal, or coke on the grate D is blown up to a state of incandescence by a forced draft. This may be derived from the blower (shown in Fig. 1) by closing the valve $k$ and all the valves in the pipes E'' and leaving the valve $n$ open. The air is then driven out through the cone X into the pipe N. I is the screw-joint by which extension N' is attached to pipe N. After the fuel is sufficiently incandescent the pulverized fuel is fed into the supply-pipe $w$ of the blower and into the furnace with the compressed-air blast through A. Entering into the furnace the compressed-air blast, loaded with pulverized fuel, diffuses itself all around the outlet, thus avoiding any destructive effects of the blast, and is ignited. The pulverized fuel burns out very fast in producing carbonic acid. By rising up through the bed of glowing fuel in the upper part of the furnace the carbonic acid takes up another atom of carbon, which converts it into carbonic oxide. After a run of about five minutes the blower is stopped. Then the steam is introduced into the porous cylinders B by means of the pipe $b$. The radiation of the heat in the lower part of the furnace having highly heated the porous cylinders B, it follows that said steam is readily superheated and passes through the pores of the pipes B nearly dissociated, according to the laws of "dissociation." In rising through the bed of glowing fuel the oxygen of the steam will combine with the carbon of the fuel, because of the high temperature and volatilization of the carbon in the furnace. Carbonic oxide will thus be produced and the hydrogen of the steam liberated. The transformation of the carbonic acid into carbonic oxide and the decomposition of steam to form carbonic oxide and hydrogen, said transformation and decomposition taking place in alternate runs of about five minutes each, the furnace being fed with pulverized fuel or atomized oil in the first run and with steam in the following run, will give off a great and even flow of gases, in which the nitrogen of the air, the only non-combustible element, will amount to less than thirty-five per cent. of the whole product. The heated air passing up through the space $e$ can be drawn off through pipe $e''$ by a suitable exhauster and used for heating purposes, or as a hot-blast to aid in the combustion of the gases generated by my apparatus. The gases generated by the various reactions in the furnace pass up through the pipe M. This pipe being porous, the hydrogen passes more freely through its pores than the heavier gases by reason of its feeble density and of the great molecular activity resulting from the high temperature of the gases, since I know that endosmosis is a consequence of the molecular movement, and that each gas is impelled by its own peculiar molecular force, which, in hydrogen, is greater than any other gas, and by the exhausting action of a suitable exhauster and blower fixed to the pipe $g$. The gases collected in the annular space G, Fig. 2, have therefore a higher percentage of hydrogen than those remaining in the pipe M and can be drawn off through pipe $g$ and burned or stored separately from the gases delivered by pipe M. The heavier gases pass on through a metallic extension of the pipe M, (not shown,) and may be burned in any suitable apparatus or stored up for future use.

It should be understood that when the separation of the hydrogen from the carbonic oxide is not required the porous pipe M shall be removed and the various changes in the shape of the various parts of my invention may be made without departing from the spirit thereof so long as the relative arrangement of parts is preserved and pulverized fuel or atomized oil used.

Forms of blower and compressor other than that illustrated may be used, and various kinds of porous material employed to form the elements which should have a porous construction, as described.

The proportion and composition of the liquid to load charcoal or coke may be changed, and either pulverized coal or other pulverized fuel may be mixed with pulverized charcoal or coke, or vaporized or sprayed oil may be used, as provided for.

Having therefore described my invention, which I claim as new, and desire to protect by Letters Patent, is—

1. In a gas-producer, the combination of the furnace containing a grate, the steam-supplying pipes of porous material and the pulverized-fuel inlet, both below said grate, the outlet-pipe for the gases, which connects with the upper part of the furnace, and the strainer arranged in said pipe, substantially as described.

2. The combination, with the furnace, of a gas-producer and the pipes which supply steam and fuel to said furnace, an outlet-pipe of porous material, a second pipe of non-porous material which surrounds the first and leaves an annular chamber between, and pipes for conveying away the gases remaining within the porous pipe separate from those collecting in the annular chamber, together with the casing which surrounds the furnace and pipes at a distance therefrom sufficient to form a space between said casing and the furnace-walls, substantially as described.

In testimony whereof I affix my signature in presence of two witnesses.

CHARLES FIESSE.

Witnesses:
JOHN A. E. WARD,
JOSEPH B. PAYEZ.